J. GENTILE.
GAS FIXTURE.
APPLICATION FILED JUNE 18, 1921.

1,424,351.

Patented Aug. 1, 1922.

Inventor
Joseph Gentile
By his Attorney
Maxwell E. Sparrow

J. GENTILE.
GAS FIXTURE.
APPLICATION FILED JUNE 18, 1921.
1,424,351.
Patented Aug. 1, 1922.
2 SHEETS—SHEET 2.
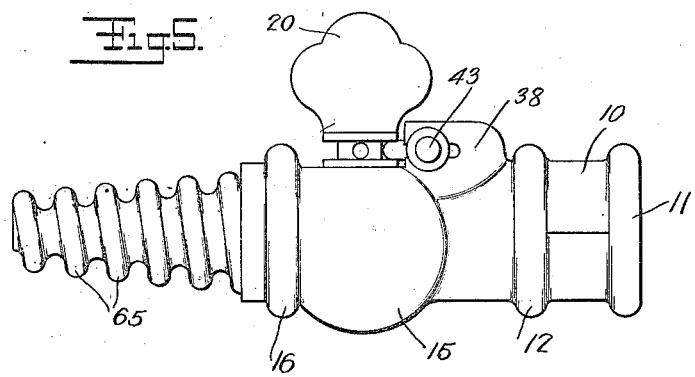
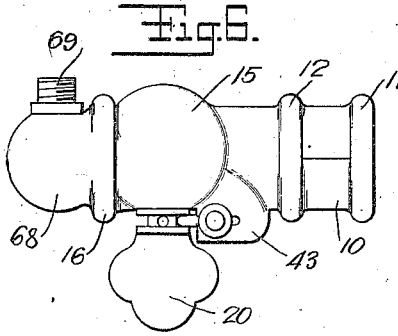
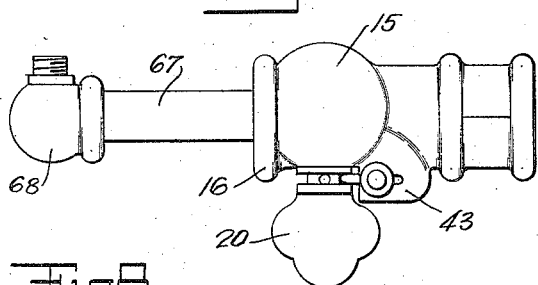
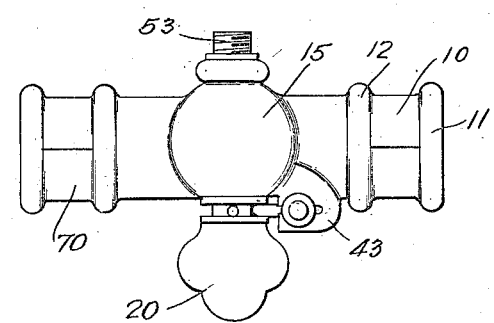
Inventor
Joseph Gentile
By his Attorney
Maxwell E. Sparrow

UNITED STATES PATENT OFFICE.

JOSEPH GENTILE, OF BROOKLYN, NEW YORK.

GAS FIXTURE.

1,424,351.　　　Specification of Letters Patent.　　Patented Aug. 1, 1922.

Application filed June 18, 1921. Serial No. 478,548.

*To all whom it may concern:*

Be it known that I, JOSEPH GENTILE, a subject of the King of Italy, and a resident of the borough of Brooklyn, in the county of Kings and State of New York, have invented certain new and useful Improvements in Gas Fixtures, of which the following is a specification.

The main object of this invention is to provide an improved gas fixture in which the key is held in a novel manner within the body of the cock whereby the possibility of leakage is reduced.

A further object is to provide means for positively locking the cock plug in its open position, or either of its closed positions, thereby minimizing the possibility of leaving the cock partially open.

Another object is to combine with the body extension a rotatable arm, means for maintaining the arm in lateral angular adjustment being a component part of the invention.

These and other analogous objects, including neatness of design, improvement in appearance, ease of operation, non-liability of loss of gas by leakage and general adaptability, are attained by the novel construction, combination and arrangement of parts, hereinafter described and shown in the accompanying drawings forming an essential part of this disclosure, and in which:—

Figure 5 is a side view showing a modified form of the fixture as used in connection with a flexible hose.

Figure 6 is a similar view of a fixture and burner stem combined.

Figure 7 is a like view of a fixture having a lengthened connection to the burner stem.

Figure 8 is a side view of a fixture arranged for hall lights.

Figure 1:
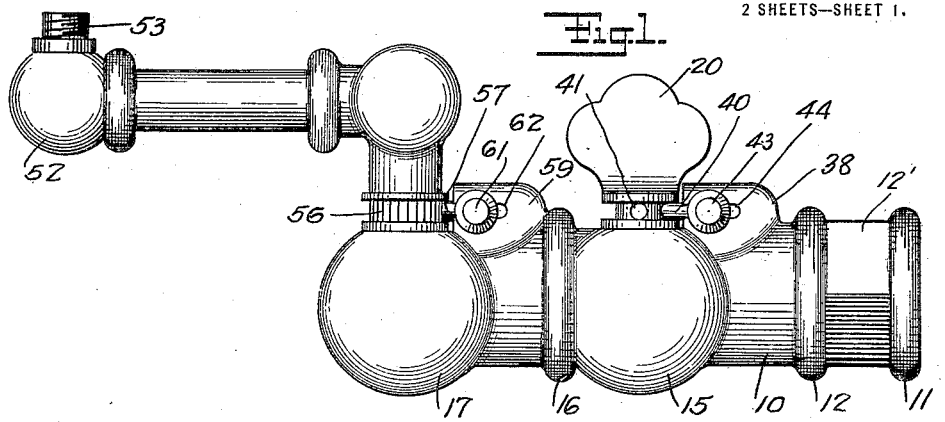
Figure 1 is a side elevational view of a gas fixture showing a pivoted arm connection, the fixture being made in accordance with the invention.

Referring to the drawings in detail, the numeral 10 designates in general a substantially cylindrical body having raised reenforcing rings 11 and 12 respectively and a hexagonal portion 12' thereinbetween, at the end to which attachment is made to the gas supply source, and at a distance therefrom corresponding to the depth of the bore 14. The hexagonal portion 12' permits of the fixture being gripped by a tool while being secured to the source.

A globular enlargement 15 is disposed midway in the body adjacent to which is another ring 16 and a similar globular enlargement 17 is formed at the outer terminus of the body.

Extending axially from the opening 14 is a gas passage 18, the same being controlled by a tapered plug 19 having a key stem 20 joined by a neck 21, the plug 19 containing a transverse bore 22 registrable with the passage 18.

Figure 2:
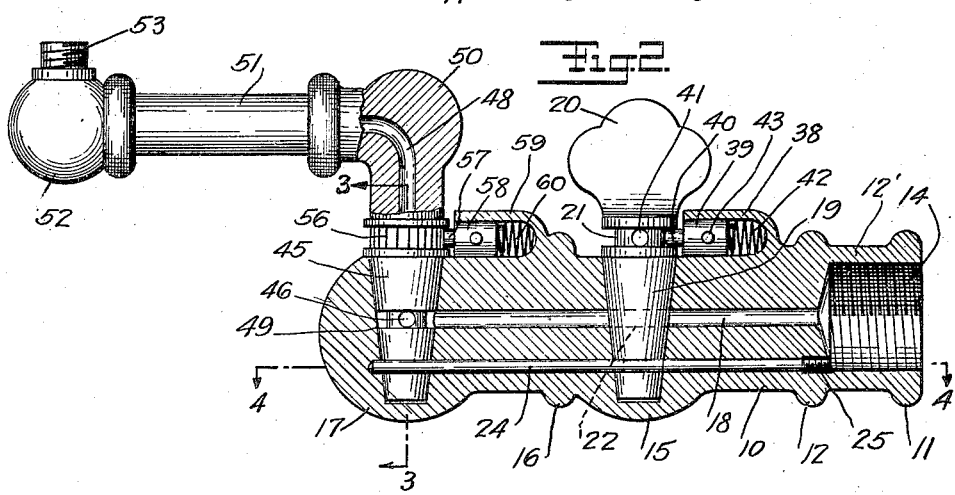
Figure 2 is a partial side, partial longitudinal sectional view of the same.
Figures 3, 4:
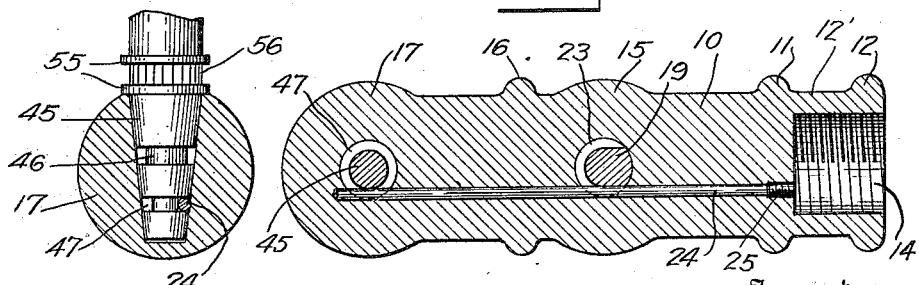
Figure 3 is a fragmentary transverse sectional view taken substantially in a plane represented by the line 3—3 of Figure 2.
Figure 4 is a longitudinal sectional view of the fixture body taken on line 4—4 of Figure 2.

In the lower end of the plug 19 is a recess 23 extending approximately three quarters of its circumference, the same being engaged by a pin 24 secured by its screwthreaded head 25 in a drilled opening, parallel with the passage 18, the pin being entered through the inlet opening 14, as shown best in Figures 2 and 4.

From the foregoing it will be seen that the threaded rod 24 effectually prevents the plug from moving upward in the body and further, prevents turning the plug completely around.

A raised lug 38, formed on the body 10, adjacently rearward of the opening for the cock plug 19, is bored to receive the enlarged body 39 of a plunger pin 40 adapted to enter holes 41 in the neck 21 of the key, thereby holding the same in adjusted angular position, closing or opening the passage through the plug.

The plunger body 39 is projected outward from the bore by a coiled compression spring 42 and provided with a knob 43 the stem of which is slidable in a slot 44 formed laterally through the wall of the lug.

From the foregoing it will be evident that the keyed plug is positively held in its tapered seat, and can be rotated in the usual manner by hand into open or closed position, and is automatically held in such position, thereby preventing its inadvertent and undesired action, it being necessary to first retract the plunger before the key can be turned.

In the outer globular end 17 is a similar conical bored opening, receptive of the tapered plug 45, the same having an annular recess 46 communicating with the gas passage 18, and a lower annular recess 47 in which the front end of the pin 24 engages in such manner as to prevent removal of the plug but permitting it to be completely rotated.

A central passage 48 in the plug 45 communicates with the recess 46 by the opening 49, the upper end of the passage extending into the globular head 50 of the plug and thence is turned at a right angle, leading centrally through the swing arm member 51, and elbow 52 to the outlet 53 which is provided with exterior screw threads for connection with a burner.

Immediately above the tapered plug 45 are a pair of collars 55 having between them a ring 56 provided with angular teeth disposed longitudinally between the collars.

Engaging these teeth is a detent 57 having an enlarged body 58 slidable in a bored recess formed in another lug 59, similar in all respects to the lug 38, provided with a spring 60 and knob 61 operative in the slot 62 as before described.

Thus the plug 45 held in any desired adjustment by the spring impelled detent, within the angle of the teeth, as will be clearly understood.

In the modification shown in Figure 5, the construction is identical with the foregoing description up to the ring 16, after which, in place of the pivoted plug, is a coarsely threaded, tapering tubular projection 65 to which may be attached a flexible hose, conveying the gas to any desired point.

Figure 6 shows the same fixture in a reversed position, and having beyond the ring 16 an elbow 68 leading upward to the outlet 69 provided to receive a burner in a manner similar to the outlet 53.

The disposition of parts shown in Figure 7 are the same as in Figure 6 except that a nipple or pipe 67 is interposed between the ring 16 and elbow 68 as shown.

The arrangement, shown in Figure 8, indicates the burner connection 53 as in alignment with the key 20, and a projection 70 arranged to receive a gas pipe leading to desired points.

In operation, the parts being assembled as indicated and the plug 19 turned to cut off the gas passage, which condition would be indicated by the key 20 being disposed transversely to the body, the knob 43 is pressed towards the rear, withdrawing the detent 40 from one of the lateral openings 41 in the key neck and held outward while the key is turned, in either direction to become parallel with the body, whereupon the knob is released and this detent engages the middle opening, holding the plug against accidental or premature displacement, with its passage 22 in register with the passage 18.

Obviously the detent must be withdrawn before the key can again be turned.

The arm 51 is also adjusted on a vertical axis by withdrawing the detent 57 in a similar manner, the detent holding the arm in a substantially rigid manner when in engagement with the teeth 56.

While certain preferred embodiments of this device have been shown and described, it will be understood that changes in the form, arrangements, proportions, sizes and details thereof may be made without departing from the scope of the invention as defined in the appended claims.

Having thus described my invention what I claim as new and desire to secure by Letters Patent, is:—

1. A gas fixture comprising a body having means for attachment to a gas pipe, said body containing a longitudinal passage, a tapered plug set transversely in said body, said plug having a transverse opening registerable with the mentioned passage, a rod engaged in said body parallel to the passage therein, said plug containing a recess extending partially therearound through which said rod passes, and means for automatically locking said plug when in adjusted position.

2. A gas fixture comprising a body attachable to a gas pipe and containing a longitudinal passage, a keyed plug controlling the passage, a rod in said body engaging said plug limiting the rotary movement thereof and preventing its withdrawal, a spring impelled plunger adapted to engage openings in said plug, maintaining it in adjusted position, and means for retracting said plunger.

3. A gas fixture comprising a body having a longitudinal passage, a keyed plug controlling the passage, means in said body for retaining the plug therewithin, means for positionally holding the plug, a hollow element having a tapered portion rotatable in the outer end of said body, the opening in said element being in communication with the mentioned passage, said plug holding means also engaging the tapered element, and means carried by said body adapted to retain said tapered element in adjusted position.

4. A gas fixture comprising a body having a longitudinal passage, a keyed plug controlling the passage, a second plug in said body leading to a burner, said second plug having an opening communicating with the body passage, and means contained in said body common to both plugs whereby they are retained therein.

5. A gas fixture comprising a body having a longitudinal passage, a keyed plug controlling the passage, a second plug in said body leading to a burner, said second plug having an opening communicating with the body passage, means for locking said first plug in open or closed position means for maintaining said second plug in angular adjustment, and means contained in said body common to both plugs whereby they are retained therein.

6. In a gas fixture, the combination with a body having a central longitudinal passage, a control key therefor and a swivel arm adapted to receive a burner, of a tapered plug formed with said arm engaging said body, said plug having an annular recess, a pin removably engaged in said body, extending into the recess, a cylindrical element above said plug having longitudinal peripheral teeth, a spring impelled detent on said body engaging the teeth and means for retracting said detent.

Signed at New York, in the county of New York and State of New York this 4 day of June, A. D. 1921.

JOSEPH GENTILE.